(12) United States Patent
Takemoto

(10) Patent No.: US 8,130,234 B2
(45) Date of Patent: Mar. 6, 2012

(54) COMPUTER GRAPHICS RENDERING APPARATUS AND METHOD

(75) Inventor: Takashi Takemoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 658 days.

(21) Appl. No.: 12/253,566

(22) Filed: Oct. 17, 2008

(65) Prior Publication Data

US 2009/0102851 A1 Apr. 23, 2009

(30) Foreign Application Priority Data

Oct. 19, 2007 (JP) .................................. 2007-272488

(51) Int. Cl.
*G09G 5/00* (2006.01)
*G06T 11/40* (2006.01)
*G06K 9/40* (2006.01)
*G06K 9/36* (2006.01)

(52) U.S. Cl. ........ 345/587; 345/581; 345/586; 345/606; 345/552; 382/254; 382/276; 382/300

(58) Field of Classification Search ................. 345/418, 345/428, 581–587, 589, 606, 618, 501, 552, 345/557, 643; 382/254, 274, 276, 285, 299–300
See application file for complete search history.

(56) References Cited

U.S. PATENT DOCUMENTS

| | | | |
|---|---|---|---|
| 6,005,582 A | * | 12/1999 | Gabriel et al. ............... 345/586 |
| 6,924,811 B1 | | 8/2005 | Minkin |
| 2007/0165035 A1 | * | 7/2007 | Duluk et al. .................. 345/506 |

FOREIGN PATENT DOCUMENTS

JP 2005-025254 1/2005

OTHER PUBLICATIONS

Hakura, et al., The Design and Analysis of a Cache Architecture for Texture Mapping, International Symposium on Computer Architecture, 1997.
Japanese Office Action for Japanese Patent Application No. 2007-272488 mailed on Oct. 21, 2011.

* cited by examiner

*Primary Examiner* — Wesner Sajous
(74) *Attorney, Agent, or Firm* — Turocy & Watson, LLP

(57) ABSTRACT

A computer graphics rendering apparatus according to an embodiment of the present invention generates a screen image, using plural texture images having different mipmap levels. The apparatus generates a normalized texture coordinate of a texture image, generates, from the normalized texture coordinate of the texture image, a texel coordinate of a texel in the texture image, according to a mipmap level of the texture image, and generates, regarding an image block in the texture image, an index value indicating a cache line corresponding to the image block, using a texel coordinate of a texel in the image block. The apparatus generates the index value such that index values of image blocks in the same position are different, between two texture images having mipmap levels adjacent to each other.

20 Claims, 9 Drawing Sheets

FIG. 7

| | | $B_1$ | | $I_{T1}$ | $B_{1A}$ | $B_{1C}$ | |
|---|---|---|---|---|---|---|---|
| 2 | 10 | 34 | 42 | 0 | 8 | 32 | 40 |
| 6 | 14 | 38 | 46 | 4 | 12 | 36 | 44 |
| 18 | 26 | 50 | 58 | 16 | 24 | 48 | 56 |
| 22 | 30 | 54 | 62 | 20 | 28 | 52 | 60 |
| 3 | 11 | 35 | 43 | 1 | 9 | 33 | 41 |
| 7 | 15 | 39 | 47 | 5 | 13 | 37 | 45 |
| 19 | 27 | 51 | 59 | 17 | 25 | 49 | 57 |
| 23 | 31 | 51 | 63 | 21 | 29 | 53 | 61 |

COMPUTER GRAPHICS RENDERING APPARATUS AND METHOD

CROSS REFERENCE TO RELATED APPLICATION

This application is based upon and claims the benefit of priority from the prior Japanese Patent Application No. 2007-272488, filed on Oct. 19, 2007, the entire contents of which are incorporated herein by reference.

BACKGROUND OF THE INVENTION

1. Field of the Invention

The present invention relates to a computer graphics rendering apparatus and a computer graphics rendering method.

2. Background Art

In the field of computer graphics, a method called texture mapping is widely known. In the texture mapping, it is possible to give texture to an object in an image, by pasting a texture image on the surface of the object. In the texture mapping, in order to realize an increase in speed of image processing, plural texture images having different resolutions are often used to represent the texture. Each of the texture images is called mipmap. The level of the resolution of each texture image is represented by a number called a mipmap level.

In such texture mapping, plural texture images having different mipmap levels may be simultaneously referred to. In this case, accesses to these images occur simultaneously in a texture cache. Therefore, a conflict of a cache line may occur among these images. In other words, a same cache line may be used for these images.

In general, such conflict can be prevented by adopting a set associative approach of two or more ways (hereinafter referred to as "associative approach") or an approach of dividing a cache into two sets such as a set for mipmaps at even levels and a set for mipmaps at odd levels (hereinafter referred to as "division approach") (see, for example, Ziyad S. Hakura and Anoop Gupta, Stanford University, "The Design and Analysis of a Cache Architecture for Texture Mapping", International Symposium on Computer Architecture, 1997). However, in the associative approach, an increase in a circuit cost due to an increase in associativity poses a problem. Further, in the division approach, it is likely that only a half of the total capacity of the cache is used in some case. Therefore, in the division approach, deterioration in efficiency of the cache poses a problem. For example, when texture is given to a large object, only a mipmap at level 0 is used even if a mipmap function is adopted. In this case, a half of the total capacity of the cache (a set for odd levels) is not used at all.

As described above, in the associative approach and division approach, wastes related to caching of texture images, such as an increase in a circuit cost and deterioration in efficiency of the cache, pose problems.

SUMMARY OF THE INVENTION

An aspect of the present invention is, for example, a computer graphics rendering apparatus for generating a screen image, using plural texture images having different mipmap levels, the apparatus including a first coordinate generating unit configured to generate a normalized texture coordinate of a texture image, a second coordinate generating unit configured to generate, from the normalized texture coordinate of the texture image, a texel coordinate of a texel in the texture image, according to a mipmap level of the texture image, and an index generating unit configured to generate, regarding an image block in the texture image, an index value indicating a cache line corresponding to the image block, using a texel coordinate of a texel in the image block, the index generating unit generating the index value such that index values of image blocks in the same position are different, between two texture images having mipmap levels adjacent to each other.

Another aspect of the present invention is, for example, a computer graphics rendering method for generating a screen image, using plural texture images having different mipmap levels, the method including generating a normalized texture coordinate of a texture image, generating, from the normalized texture coordinate of the texture image, a texel coordinate of a texel in the texture image, according to a mipmap level of the texture image, and generating, regarding an image block in the texture image, an index value indicating a cache line corresponding to the image block, using a texel coordinate of a texel in the image block, the method generating the index value such that index values of image blocks in the same position are different, between two texture images having mipmap levels adjacent to each other.

BRIEF DESCRIPTION OF THE DRAWINGS

FIG. 7 shows an example of an index map regarding a texture image at level 0;

FIG. 8 shows an example of an index map regarding a texture image at level 1.

DESCRIPTION OF THE EMBODIMENTS

Embodiments of the present invention will be described with reference to the drawings.

Figure 1:
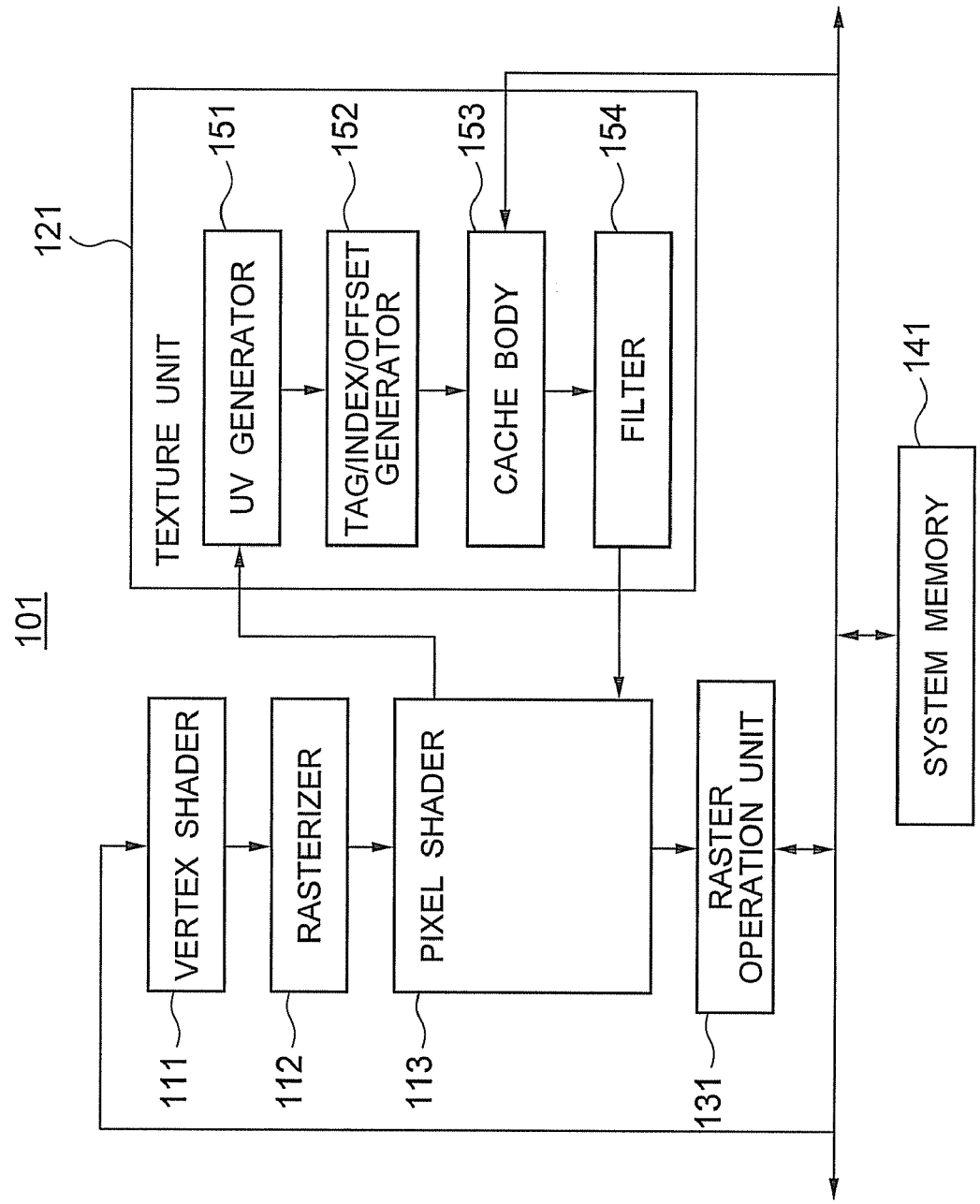
FIG. 1 is a block diagram of a computer graphics rendering apparatus according to an embodiment of the present invention.

FIG. 1 is a block diagram of a computer graphics rendering apparatus 101 according to an embodiment of the present invention. The rendering apparatus 101 in FIG. 1 includes a vertex shader 111, a rasterizer 112, a pixel shader 113 as an example of a first coordinate generating unit, a texture unit 121, a raster operation unit 131, and a system memory 141. The texture unit 121 includes a UV generator 151 as an example of a second coordinate generating unit, a tag/index/offset generator 152 as an example of an index generating unit and an offset generating unit, a cache body 153 as an example of a judgment unit, and a filter 154.

Figure 2:
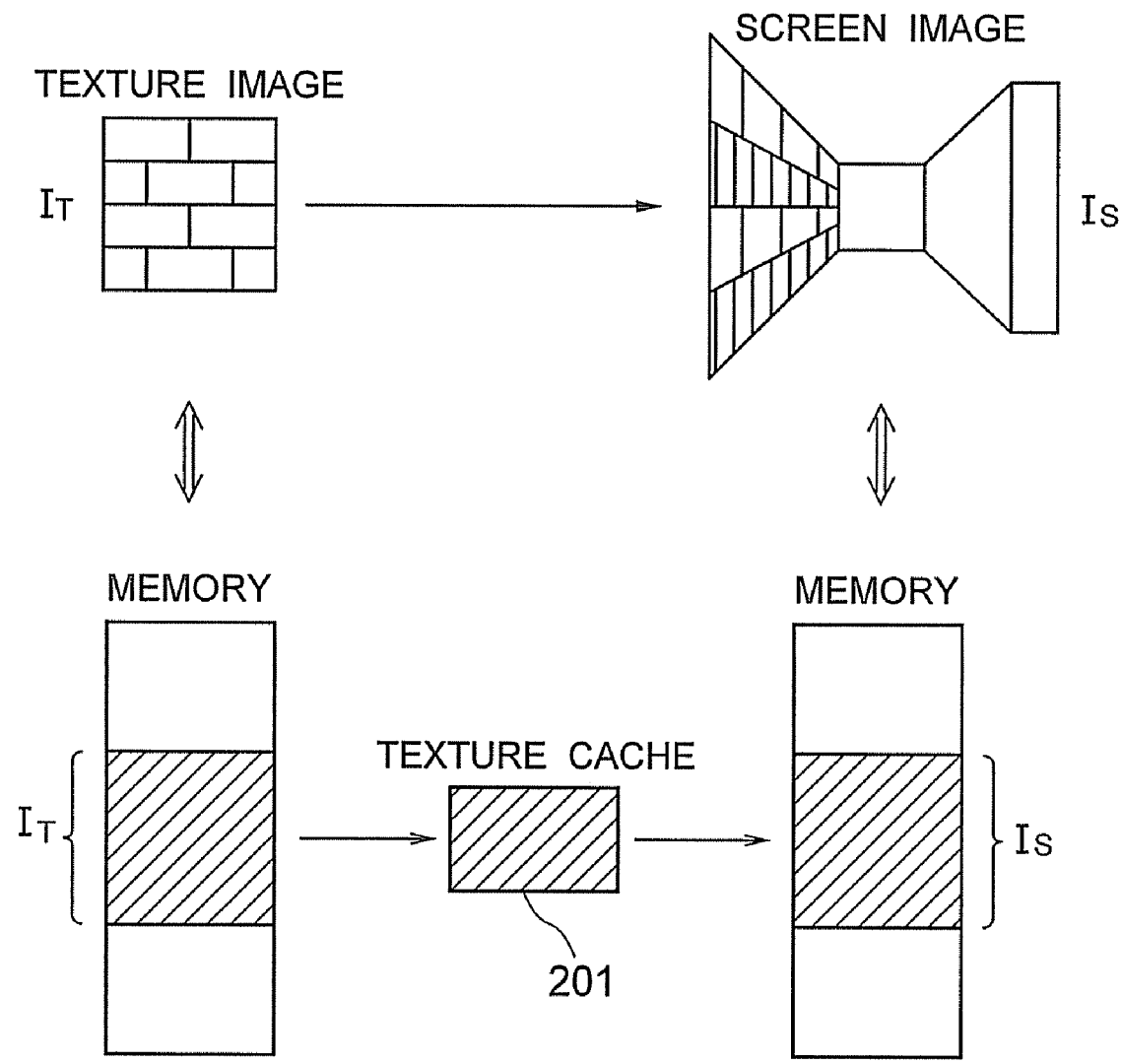
FIG. 2 is a diagram for explaining a texture image and a screen image.

As shown in FIG. 2, the rendering apparatus 101 in FIG. 1 generates a screen image using a texture image. In FIG. 2, a screen image $I_S$ is generated from a texture image $I_T$. In FIG. 2, the texture image $I_T$ and the screen image $I_S$ are stored in memories. When the screen image $I_S$ is generated from the texture image $I_T$, the texture image $I_T$ is temporarily stored in a texture cache 201.

Figure 3:
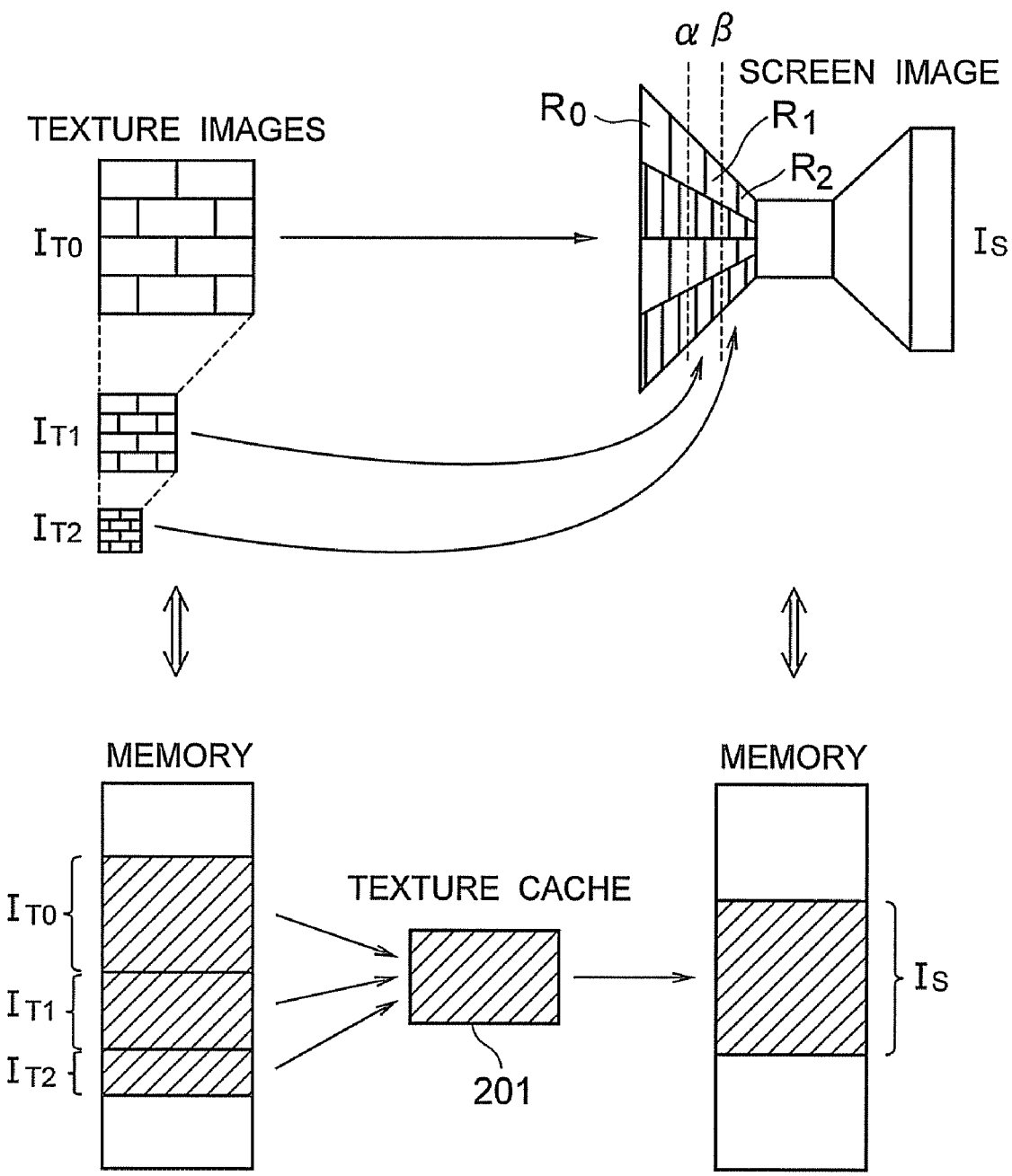
FIG. 3 is a diagram for explaining a mipmap and a mipmap level.

As shown in FIG. 3, the rendering apparatus 101 in FIG. 1 can generate a screen image using plural texture images, which are mipmaps having different mipmap levels. In FIG. 3, a screen image $I_S$ is generated from texture images $I_{T0}$, $I_{T1}$, and $I_{T2}$ at levels 0, 1, and 2. In FIG. 3, the texture images $I_{T0}$, $I_{T1}$, and $I_{T2}$ and the screen image $I_S$ are stored in memories. When the screen image $I_S$ is generated from the texture images $I_{T0}$, $I_{T1}$, and $I_{T2}$, the texture images $I_{T0}$, $I_{T1}$, and $I_{T2}$ are temporarily stored in the texture cache 201.

Figure 4:
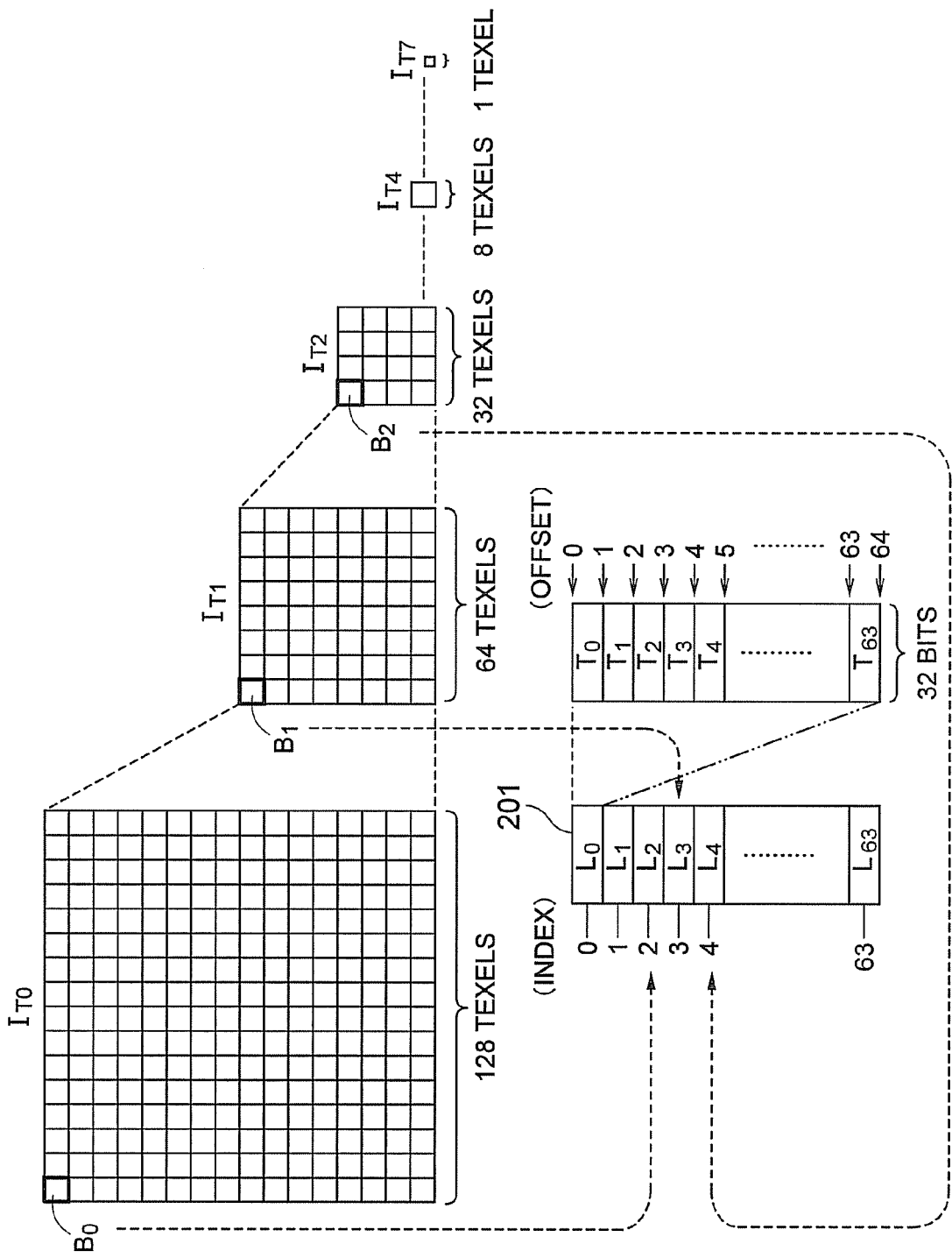
FIG. 4 is a diagram for explaining a texture cache.

FIG. 4 shows plural texture images $I_{T0}$, $I_{T1}$, $I_{T2}$, ..., and $I_{T7}$. These texture images are derived from a common original image, and have different mipmap levels. The texture images $I_{T0}$, $I_{T1}$, $I_{T2}$, ..., and $I_{T7}$ are mipmaps having mipmap levels 0, 1, 2, ..., and 7, respectively. In this embodiment, the size of the original image is 128×128 pixels. Therefore, sizes of the texture images $I_{T0}$, $I_{T1}$, $I_{T2}$, ..., and $I_{T7}$ are 128×128 texels, 64×64 texels, 32×32 texels, and 1×1 texels, respectively.

As cache lines in the texture cache 201, FIG. 4 shows cache lines $L_0$, $L_1$, $L_2$, ..., and $L_{63}$. The cache lines $L_0$, $L_1$, $L_2$, ..., and $L_{63}$ have indexes 0, 1, 2, ..., and 63, respectively. In the rendering apparatus 101 of FIG. 1, an image block of a texture image is stored in a cache line of the texture cache 201. FIG. 4 illustrates image blocks $B_0$, $B_1$, and $B_2$. The image blocks $B_0$, $B_1$, and $B_2$ are included in the texture images $I_{T0}$, $I_{T1}$, and $I_{T2}$, respectively. In this embodiment, the size of these image blocks is 8×8 texels. As texels of an image block stored in the cache line $L_0$, FIG. 4 shows texels $T_0$, $T_1$, $T_2$, ..., and $T_{63}$. The texels $T_0$, $T_1$, $T_2$, ..., and $T_{63}$ have offsets 0, 1, 2, ..., and 63, respectively.

Figure 5:
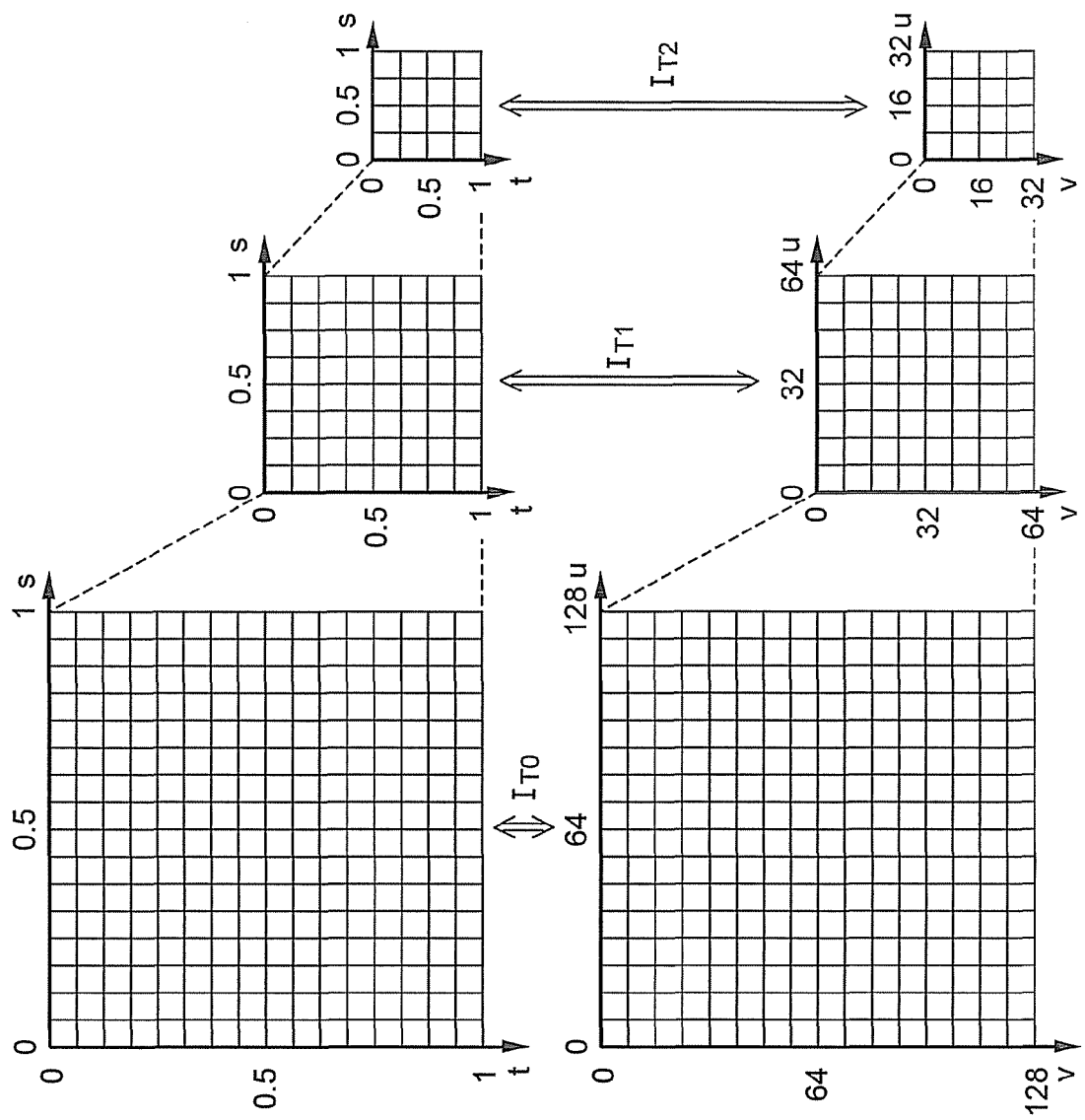
FIG. 5 is a diagram for explaining a normalized texture coordinate and a texel coordinate.

FIG. 5 shows a texture image $I_{T0}$ having 128×128 texels, a texture image $I_{T1}$ having 64×64 texels, and a texture image $I_{T2}$ having 32×32 texels. Further, FIG. 5 shows normalized texture coordinates (s, t) and texel coordinates (u, v) of these texture images. In FIG. 5, "s" and "t" represent horizontal and vertical components of a normalized texture coordinate, respectively. Further, in FIG. 5, "u" and "v" represent horizontal and vertical components of a texel coordinate, respectively.

The normalized texture coordinate is a coordinate system in which a distance from one end to the other end of a texture image is set to 1. In the normalized texture coordinate, regardless of the size and mipmap level of the texture image, the coordinate at the upper left end (or the lower left end) of the texture image is (0, 0), and the coordinate at the lower right end (or the upper right end) of the texture image is (1, 1).

The texel coordinate is a coordinate system in which an interval between adjacent two texels is set to 1. In the texel coordinate, the coordinate at an end point of a texture image depends on the size and mipmap level of the texture image. In the texture image $I_{T0}$, the coordinate at the upper left end (or the lower left end) of the image is (0, 0), and the coordinate at the lower right end (or the upper right end) of the image is (128, 128). In the texture image $I_{T1}$, the coordinate at the upper left end (or the lower left end) of the image is (0, 0), and the coordinate at the lower right end (or the upper right end) of the image is (64, 64). In the texture image $I_{T2}$, the coordinate at the upper left end (or the lower left end) of the image is (0, 0), and the coordinate at the lower right end (or the upper right end) of the image is (32, 32).

The size of the original image of a certain texture image is assumed to be W×H pixels. In this case, relations $u = s \times W/2^L$ and $v = t \times H/2^L$ hold between a normalized texture coordinate and a texel coordinate of the texture image. In the relations, L represents the mipmap level of the texture image.

Operations of respective blocks shown in FIG. 1 are explained below.

The vertex shader 111 receives vertex row data of a polygon to be rendered from the system memory 141, performs coordinate conversion and lighting by the vertex, and generates coordinate values and various parameters of each vertex.

The rasterizer 112 receives the coordinate values and various parameters of each vertex from the vertex shader 111, and generates pixels in the polygon and various parameters of each pixel.

The pixel shader 113 receives the various parameters of each pixel from the rasterizer 112, and performs lighting and other processes by the pixel. In the processes by the pixel by the pixel shader 113, texture is referred to if it is necessary. In this case, the pixel shader 113 generates and outputs a normalized texture coordinate of a texture image.

The UV generator 151 receives the normalized texture coordinate from the pixel shader 113. The UV generator 151 then generates, from the normalized texture coordinate, a coordinate on the texture image (texel coordinate), according to the size and mipmap level of the texture image. In this way, a texel coordinate of each texel in the texture image is generated from the normalized texture coordinate of the texture image, according to the size and mipmap level of the texture image.

The tag/index/offset generator 152 receives the texel coordinate of the texture image from the UV generator 151. The tag/index/offset generator 152 then generates, regarding the texture image, a tag of a cache 201 corresponding to the texture image, using a texel coordinate of a texel in the texture image.

The tag/index/offset generator 152 further generates, regarding an image block in the texture image, an index value indicating a cache line corresponding to the image block, using a texel coordinate of a texel in the image block.

The tag/index/offset generator 152 further generates, regarding a texel in the texture image, an offset value indicating an address corresponding to the texel, using a texel coordinate of the texel. The offset is a relative address indicating a position of the texel in the cache line.

The cache body 153 receives the tag, the index, and the offset from the tag/index/offset generator 152. The cache body 153 accesses the cache 201 corresponding to the tag, and judges whether the image block is present in the cache line indicated by the index value.

In the case of a cache mistake, i.e., when the image block is not present, the cache body 153 reads out the image block from the cache line, after refilling the cache line with the image block from the system memory 141. In reading out a desired texel, the offset value is used.

In the case of a cache hit, i.e., when the image block is present, the cache body 153 reads out the image block from the cache line, without refilling the cache line with the image block from the system memory 141. In reading out a desired texel, the offset value is used.

The filter 154 receives the read-out texel from the cache body 153, and applies texture filtering to the texel. The filtered texel is sent to the pixel shader 113, and processed by the pixel shader 113. The texel processed by the pixel shader 113 is sent to the raster operation unit 131, processed by Z buffering (hidden-surface removing) and α blending, and then written in a frame buffer in the system memory 141.

Figure 6:
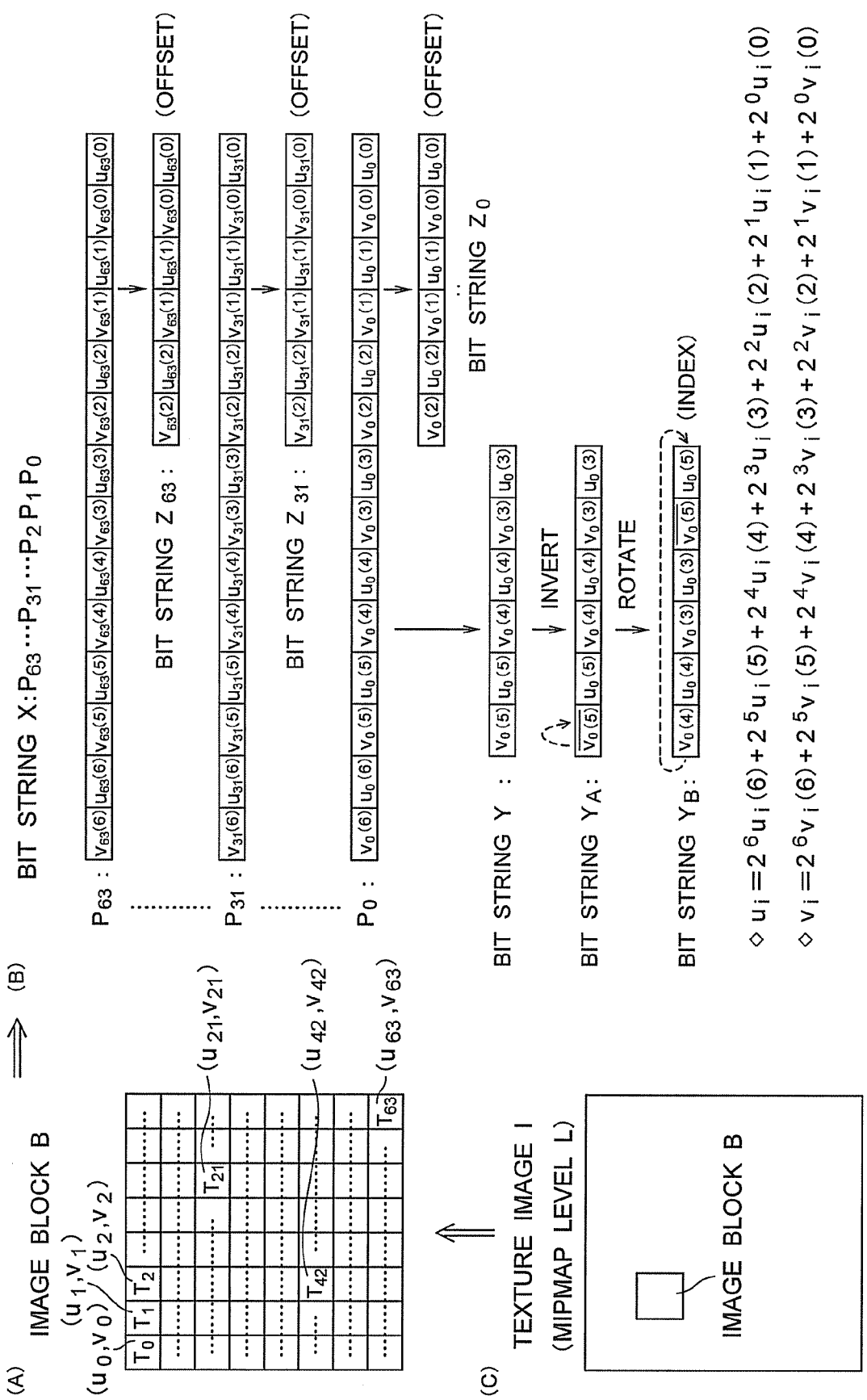
FIG. 6 is a diagram for explaining an index value and an offset value.

FIG. 6 is a diagram for explaining a process of generating an index value and an offset value by the tag/index/offset generator 152.

FIG. 6A shows an image block B. The size of the image block B is 8×8 texels. Texel coordinates (u, v) of texels $T_0$, $T_1$, $T_2$, ..., and $T_{63}$ in the image block B are represented as $(u_0, v_0)$, $(u_1, v_1)$, $(u_2, v_2)$, ..., and $(u_{63}, v_{63})$, respectively. The texel coordinate (u, v) of an arbitrary texel $T_i$ in the image block B is represented as $(u_i, v_i)$. Each of "$u_i$" and "$v_i$" is 7-bit data that can take a value from 0 to 127, and they are represented as follows:

$$u_i=2^6u_i(6)+2^5u_i(5)+2^4u_i(4)+2^3u_i(3)+2^2u_i(2)+2^1u_i(1)+2^0u_i(0).$$

$$v_i=2^6v_i(6)+2^5v_i(5)+2^4v_i(4)+2^3v_i(3)+2^2v_i(2)+2^1v_i(1)+2^0v_i(0).$$

In the above, "$u_i(0)$" to "$u_i(6)$" represent bits of first to seventh digits in the binary notation of u, respectively. Further, "$v_i(0)$" to "$v_i(6)$" represent bits of first to seventh digits in the binary notation of v, respectively.

When an index value and an offset value regarding the image block B are generated, a one-dimensional bit string is generated by using the texel coordinates $(u_0, v_0)$ to $(u_{63}, v_{63})$ of the image block B. As an example of such bit string, FIG. 6B shows a bit string X. The bit string X is a sequence like $P_{63} \ldots P_2P_1P_0$. In this embodiment, $P_0, P_1, P_2, \ldots,$ and $P_{63}$ are bit strings generated by using the texel coordinates $(u_0, v_0), (u_1, v_1), (u_2, v_2), \ldots,$ and $(u_{63}, v_{63})$, respectively. In this embodiment, $P_i$ is a bit string arranged like $v_i(6)u_i(6), \ldots, v_i(2)u_i(2)v_i(1)u_i(1)v_i(0)u_i(0)$.

In this way, $P_i$ is generated by using respective bits in the binary notation of $u_i$ and $v_i$. Specifically, $P_i$ is generated by arranging bits in the binary notation of $u_i$ and bits in the binary notation of $v_i$ alternately from most significant bits (seventh digit bits) to least significant bits (first digit bits). The bit string X is generated by arranging sixty-four $P_i$.

Subsequently, as shown in FIG. 6B, a bit string Y of K bits and bit strings $Z_0$ to $Z_{63}$ of K bits are sliced from the one-dimensional bit string X. The bit number K of the bit string Y is an example of a bit number $K_1$. The bit number K of the bit strings $Z_0$ to $Z_{63}$ is an example of a bit number $K_2$. In this embodiment, $K_1$ and $K_2$ have a relation of $K_1=K_2$. However, $K_1$ and $K_2$ may have a relation of $K_1 \neq K_2$. The bit number K is an integer equal to or larger than 2. In this embodiment, the bit number K is 6.

The bit strings $Z_0, Z_1, Z_2, \ldots,$ and $Z_{63}$ are sliced from the bit strings $P_0, P_1, P_2, \ldots,$ and $P_{63}$, respectively. The bit string $Z_i$ corresponds to 0 to 5 bit portions of the bit string $P_i$. In this embodiment, six bits from the least significant bit of the bit string $P_i$ are sliced from the bit string $P_i$ as the bit string $Z_i$. In this embodiment, values represented by the bit strings $Z_0, Z_1, Z_2,$ and $Z_{63}$ are used as offset values of the texels $T_0, T_1, T_2, \ldots,$ and $T_{63}$, respectively.

The bit string Y is sliced from the bit string $P_0$. The bit string Y corresponds to 6 to 11 bit portions of the bit string $P_0$. In this embodiment, the bit string Y of six bits is sliced from the bit string $P_0$ generated by using one texel $T_0$. The bit string Y may be sliced from any one of the bit strings $P_1$ to $P_{63}$. In this embodiment, a bit string $Y_A$ of K bits is generated from the bit string Y, a bit string $Y_B$ of K bits is generated from the bit string $Y_A$, and a value represented by the bit string $Y_B$ is used as an index value of the image block B.

As shown in FIG. 6B, the bit string $Y_A$ is generated by bit inversion of a predetermined bit in the bit string Y. In this embodiment, the predetermined bit is the most significant bit in the bit string Y. However, the predetermined bit may be another bit in the bit string Y. FIG. 6B shows the inversion of the most significant bit $v_i(5)$.

As shown in FIG. 6B, the bit string $Y_B$ is generated by bit string rotation of the bit string $Y_A$. FIG. 6B shows the rotation of the bit string $Y_A$ to the left. The rotation amount of the bit string $Y_A$ is determined, based on a mipmap level L of a texture image I having the image block B (see FIG. 6C). In this embodiment, the rotation amount of the bit string $Y_A$ is 2 L bits. Therefore, rotation amounts at mipmap levels 0, 1, and 2 are 0, 2, and 4 bits, respectively.

Figure 7:
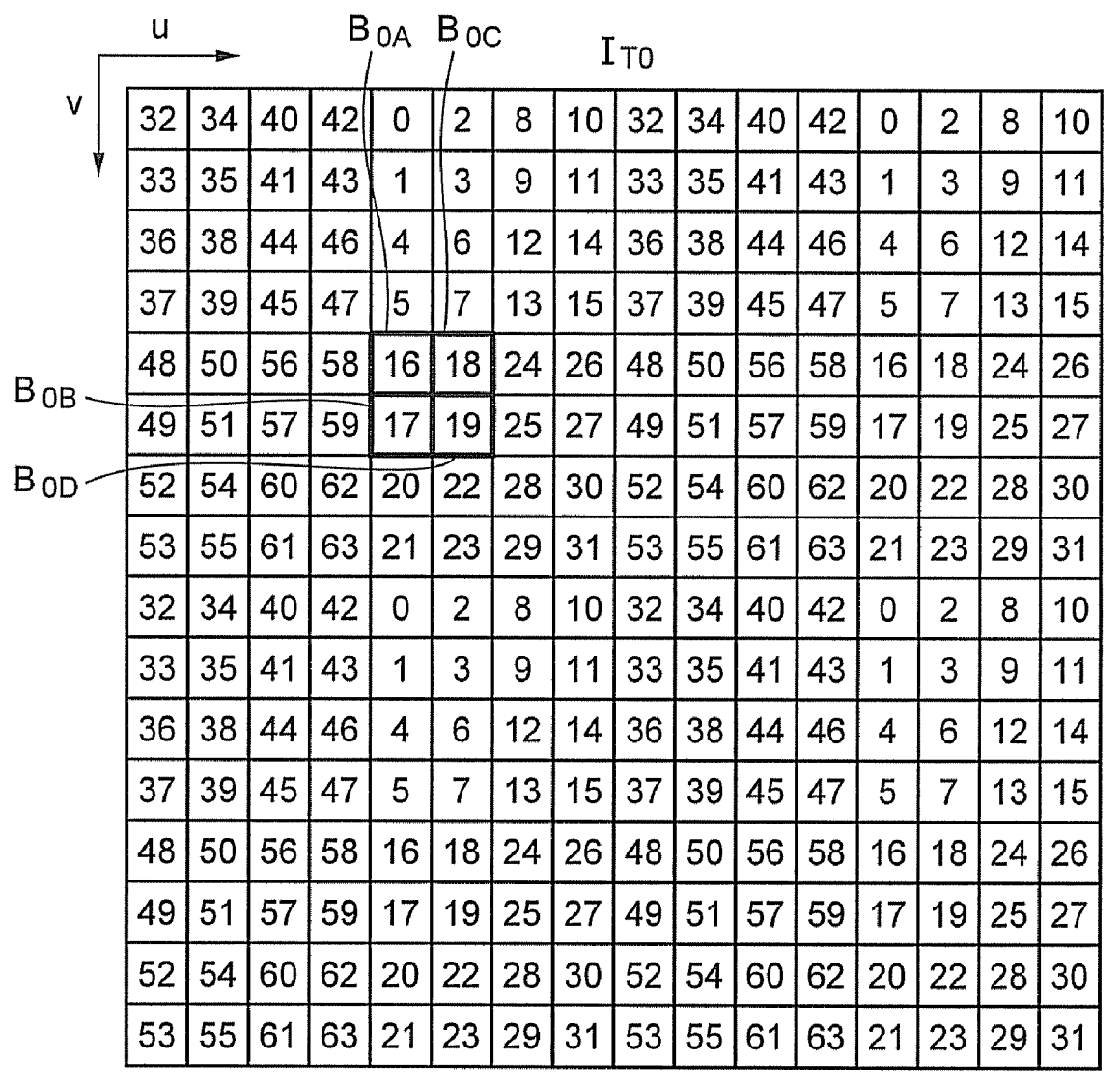
Figure 9:
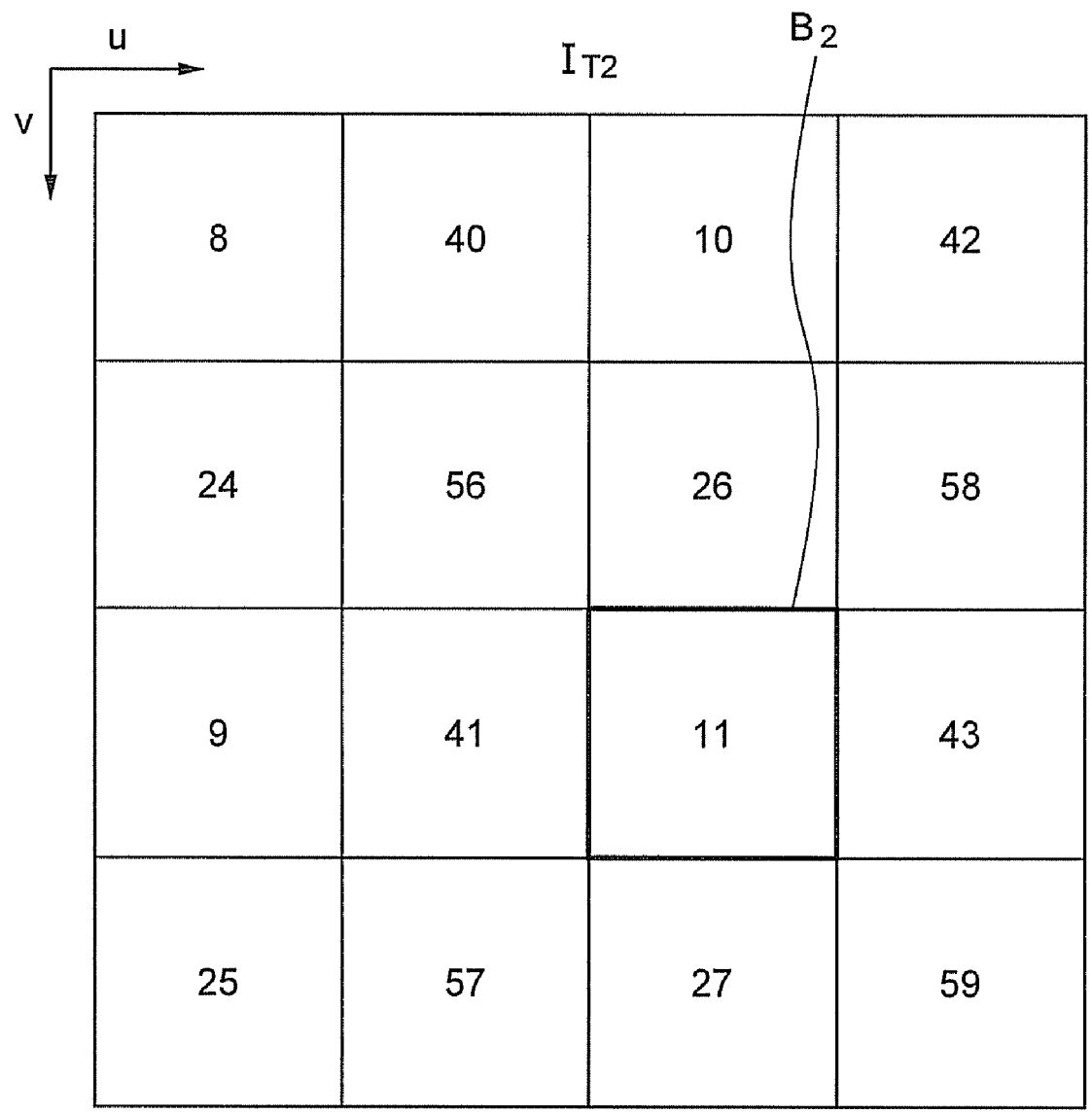
FIG. 9 shows an example of an index map regarding a texture image at level 2.

According to such process, index values shown in FIGS. 7, 8, and 9 are generated. FIGS. 7, 8, and 9 show examples of index maps regarding texture images $I_{T0}, I_{T1}$ and $I_{T2}$ having the mipmap levels 0, 1, and 2, respectively.

In FIGS. 7 to 9, index values of image blocks in the same position are different, between two texture images having mipmap levels adjacent to each other. In other words, index values of image blocks in the same position are different, between the texture image $I_{T0}$ in FIG. 7 and the texture image $I_{T1}$ in FIG. 8, and between the texture image $I_{T1}$ in FIG. 8 and the texture image $I_{T2}$ in FIG. 9.

For example, the index value of an image block $B_1$ in FIG. 8 is 50.

The image block $B_1$ in FIG. 8 is present in the same position as an image block $B_{0A}$ in FIG. 7. The index value of the image block $B_{0A}$ is 16, which is different from the index value of the image block $B_1$.

The image block $B_1$ in FIG. 8 is present in the same position as an image block $B_{0B}$ in FIG. 7 as well. The index value of the image block $B_{0B}$ is 17, which is different from the index value of the image block $B_1$.

The image block $B_1$ in FIG. 8 is present in the same position as an image block $B_{0C}$ in FIG. 7 as well. The index value of the image block $B_{0C}$ is 18, which is different from the index value of the image block $B_1$.

The image block $B_1$ in FIG. 8 is present in the same position as an image block $B_{0D}$ in FIG. 7 as well. The index value of the image block $B_{0D}$ is 19, which is different from the index value of the image block $B_1$.

Such a relation holds between all image blocks in FIG. 8 and image blocks corresponding thereto in FIG. 7. Such a relation also holds between all image blocks in FIG. 9 and image blocks corresponding thereto in FIG. 8. For example, the index value of an image block $B_2$ in FIG. 9 is 11. However, index values of image blocks $B_{1A}, B_{1B}, B_{1C},$ and $B_{1D}$ corresponding thereto in FIG. 8 are 1, 5, 9, and 13 ($\neq 11$), respectively.

As described above, the tag/index/offset generator 152 generates an index value such that index values of image blocks in the same position are different, between two texture images having mipmap levels adjacent to each other. An effect obtained by such process is explained below with reference to FIG. 3.

FIG. 3 shows regions $R_0, R_1,$ and $R_2$. The regions $R_0, R_1,$ and $R_2$ are areas where the screen image $I_S$ is generated by using the texture images $I_{T0}, I_{T1},$ and $I_{T2}$, respectively. FIG. 3 further shows a boundary $\alpha$ between the region $R_0$ and the region $R_1$, and a boundary $\beta$ between the region $R_1$ and the region $R_2$. In the process of generating such a screen image $I_S$, when an image near the boundary $\alpha$ is rendered, image blocks in the same position at the level 0 and the level 1 are often referred to simultaneously. Similarly, when an image near the boundary $\beta$ is rendered, image blocks in the same position at the level 1 and the level 2 are often referred to simultaneously. Therefore, when index values of image blocks in the same position have the same value, a conflict of a cache line occurs between the image blocks. However, in this embodiment, since index values of image blocks in the same position are different, such conflict is prevented.

Further, in this embodiment, the tag/index/offset generator 152 generates an index value such that index values of image blocks adjacent to each other are different in respective texture images. Such a process is adopted because, in the process of generating the screen image $I_S$, adjacent image blocks in respective texture images are often referred to simultaneously. Consequently, according to this embodiment, a conflict of a cache line between such image blocks can be prevented. Note that, in FIGS. 7, 8, and 9, index values are different between all adjacent image blocks.

The bit string Y and the bit string $Y_B$ shown in FIG. 6 will be compared. In this embodiment, the bit string $Y_B$ is adopted as an index value. It is also conceivable to adopt the bit string Y as an index value, instead of the bit string $Y_B$. However, in this case, between two texture images having mipmap levels adjacent to each other, there is a place where index values of image blocks in the same position are the same. For example, between the texture image in FIG. 7 and the texture image in FIG. 8, index values of image blocks at the four corners become same.

Therefore, in this embodiment, the bit string $Y_B$ is adopted as an index value. The bit string $Y_B$ is generated by applying bit inversion and bit string rotation to the bit string Y. According to the bit string rotation, it is possible to adjust a period of a change in index values according to a change in a normalized texture coordinate, to the same period regarding texture images having different mipmap levels. Consequently, in this embodiment, it is possible to prevent a situation in which index values of image blocks in the same position become same between texture images having different mipmap levels.

As described above, the bit string $Y_B$ is generated by applying the bit inversion and the bit string rotation to the bit string Y. These processes can be performed by a relatively simple circuit. Therefore, according to this embodiment, it is possible to realize, with a relatively simple circuit, an index generating process that makes index values of image blocks in the same position different between texture images having different mipmap levels. Therefore, according to this embodiment, it is possible to realize, at relatively low cost, the rendering apparatus 101 that performs such process.

In this embodiment, the index generating process may be realized by adopting a bit string other than the bit string $Y_B$. For example, such a bit string may be generated by an addition process of adding a predetermined value to the bit string Y and the bit string rotation described above. Further, such a bit string may be generated by a multiplication process of multiplying the bit string Y by a predetermined value and the bit string rotation described above.

As described above, the tag/index/offset generator 152 generates an index value such that all index values of image blocks in the same position are different, between two texture images having mipmap levels adjacent to each other. In this embodiment, as shown in FIG. 4, texture images having the levels 0 to 7 are present for an original image. In this embodiment, all index values of image blocks in the same position may be different, between the image $I_{T0}$ and the image $I_{T1}$, between the image $I_{T1}$ and the image $I_{T2}$, between the image $I_{T2}$ and the image $I_{T3}$, between the image $I_{T3}$ and the image $I_{T4}$, between the image $I_{T4}$ and the image $I_{T5}$, between the image $I_{T5}$ and the image $I_{T6}$, and between the image $I_{T6}$ and the image $I_{T7}$. On the other hand, in this embodiment, all index values of image blocks in the same position may be different, between $I_{T0}$ and $I_{T1}$, between $I_{T1}$ and $I_{T2}$, between $I_{T2}$ and $I_{T3}$, between $I_{T3}$ and $I_{T4}$, between $I_{T4}$ and $I_{T5}$, between $I_{T5}$ and $I_{T6}$, or between $I_{T6}$ and $I_{T7}$. For example, all index values of image blocks in the same position may be different only for texture images from the level 0 to a predetermined level. The above description is also applicable to index values of adjacent image blocks in respective texture images.

The tag/index/offset generator 152 may generate an index value such that index values of image blocks in the same position are different, among N (N is an integer equal to or larger than 3) texture images having mipmap levels adjacent to one another. An example in the case of N=3 is shown in FIGS. 7 to 9. In FIGS. 7 to 9, all index values of image blocks in the same position are different, between the image $I_{T0}$ and the image $I_{T1}$, between the image $I_{T1}$ and the image $I_{T2}$, and between the image $I_{T0}$ and the image $I_{T2}$. The description in the immediately preceding paragraph is also applicable to the case explained in this paragraph.

As described above, the embodiment of the present invention can provide a preferred method of caching of texture images, regarding a computer graphics rendering apparatus and a computer graphic rendering method.

Examples of specific aspects of the present invention are explained with reference to the embodiment of the present invention. However, the present invention is not limited to the embodiment.

The invention claimed is:

1. A computer graphics rendering apparatus for generating a screen image, using plural texture images having different mipmap levels, the apparatus comprising:
   a first coordinate generating unit configured to generate a normalized texture coordinate of a texture image;
   a second coordinate generating unit configured to generate, from the normalized texture coordinate of the texture image, a texel coordinate of a texel in the texture image, according to a mipmap level of the texture image; and
   an index generating unit configured to generate, regarding an image block in the texture image, an index value indicating a cache line corresponding to the image block, using a texel coordinate of a texel in the image block, the index generating unit generating the index value such that index values of image blocks in the same position are different, between two texture images having mipmap levels adjacent to each other.

2. The apparatus according to claim 1, wherein,
   the index generating unit generates the index value such that index values of image blocks in the same position are different, among N (N is an integer equal to or larger than 3) texture images having mipmap levels adjacent to one another.

3. The apparatus according to claim 1, wherein,
   the index generating unit generates the index value of $K_1$ bits ($K_1$ is an integer equal to or larger than 2) by generating a one-dimensional bit string using the texel coordinate of the image block, slicing a bit string of $K_1$ bits from the one-dimensional bit string, and performing bit string rotation for the bit string of $K_1$ bits.

4. The apparatus according to claim 3, wherein,
   the index generating unit determines a rotation amount of the bit string of $K_1$ bits, based on the mipmap level of the texture image.

5. The apparatus according to claim 3, wherein,
   the index generating unit generates the index value of $K_1$ bits by performing bit inversion for a predetermined bit in the bit string of $K_1$ bits, and the bit string rotation for the bit string of $K_1$ bits.

6. The apparatus according to claim 5, wherein,
   the index generating unit performs the bit inversion for the most significant bit in the bit string of $K_1$ bits.

7. The apparatus according to claim 3, wherein,
   the index generating unit generates the index value of $K_1$ bits by performing an addition process of adding a predetermined value to the bit string of $K_1$ bits, and the bit string rotation for the bit string of $K_1$ bits.

8. The apparatus according to claim 3, wherein,
   the index generating unit generates the index value of $K_1$ bits by performing a multiplication process of multiplying the bit string of $K_1$ bits by a predetermined value, and the bit string rotation for the bit string of $K_1$ bits.

9. The apparatus according to claim 3, wherein,
the index generating unit generates the one-dimensional bit string using bits in a binary notation of horizontal and vertical components of the texel coordinate of the image block.

10. The apparatus according to claim 9, wherein,
the index generating unit generates the one-dimensional bit string by arranging the bits in the horizontal component and the bits in the vertical component alternately from most significant bits to least significant bits.

11. The apparatus according to claim 1, further comprising:
an offset generating unit configured to generate, regarding a texel in the texture image, an offset value indicating an address corresponding to the texel, using a texel coordinate of the texel.

12. The apparatus according to claim 11, wherein,
the offset generating unit generates the offset value of $K_2$ bits ($K_2$ is an integer equal to or larger than 2) by generating a one-dimensional bit string using the texel coordinate of the texel, and slicing a bit string of $K_2$ bits from the one-dimensional bit string.

13. The apparatus according to claim 12, wherein,
the offset generating unit generates the one-dimensional bit string using bits in a binary notation of horizontal and vertical components of the texel coordinate of the texel.

14. The apparatus according to claim 13, wherein,
the offset generating unit generates the one-dimensional bit string by arranging the bits in the horizontal component and the bits in the vertical component alternately from most significant bits to least significant bits.

15. The apparatus according to claim 14, wherein,
the offset generating unit slices, from the one-dimensional bit string, $K_2$ bits from the least significant bit as the bit string of $K_2$ bits.

16. The apparatus according to claim 1, further comprising:
a judgment unit configured to judge whether the image block is present in the cache line indicated by the index value, wherein, when the image block is not present, the judgment unit reads out the image block from the cache line, after refilling the cache line with the image block, and when the image block is present, the judgment unit reads out the image block from the cache line, without refilling the cache line with the image block.

17. A computer graphics rendering method for generating a screen image, using plural texture images having different mipmap levels, the method comprising:
generating a normalized texture coordinate of a texture image;
generating, from the normalized texture coordinate of the texture image, a texel coordinate of a texel in the texture image, according to a mipmap level of the texture image; and
generating, regarding an image block in the texture image, an index value indicating a cache line corresponding to the image block, using a texel coordinate of a texel in the image block, the method generating the index value such that index values of image blocks in the same position are different, between two texture images having mipmap levels adjacent to each other, wherein the generating is performed on a computer graphics rendering apparatus that includes a memory.

18. The method according to claim 17, wherein,
the method generates the index value such that index values of image blocks in the same position are different, among N (N is an integer equal to or larger than 3) texture images having mipmap levels adjacent to one another.

19. The method according to claim 17, wherein,
the method generates the index value of $K_1$ bits ($K_1$ is an integer equal to or larger than 2) by generating a one-dimensional bit string using the texel coordinate of the image block, slicing a bit string of $K_1$ bits from the one-dimensional bit string, and performing bit string rotation for the bit string of $K_1$ bits.

20. The method according to claim 17, further comprising:
generating, regarding a texel in the texture image, an offset value indicating an address corresponding to the texel, using a texel coordinate of the texel.

* * * * *